March 17, 1964     B. O. G. HUGOSON     3,124,870
MEANS FOR REMOVING BEARINGS FROM A ROTATABLE SHAFT
Filed Aug. 11, 1961
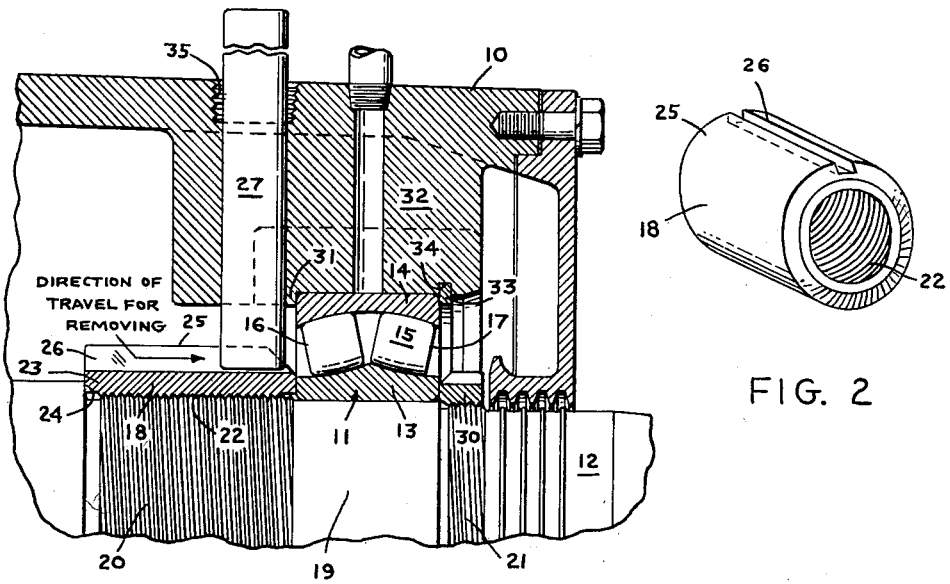
FIG. 1
FIG. 2
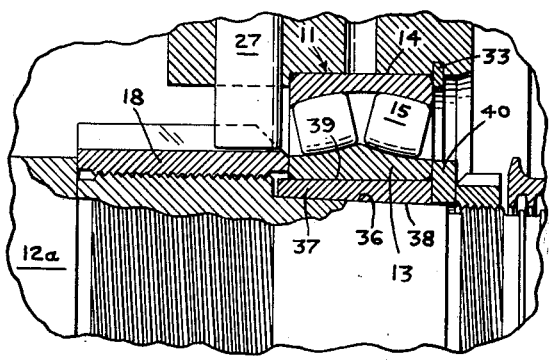
FIG. 3
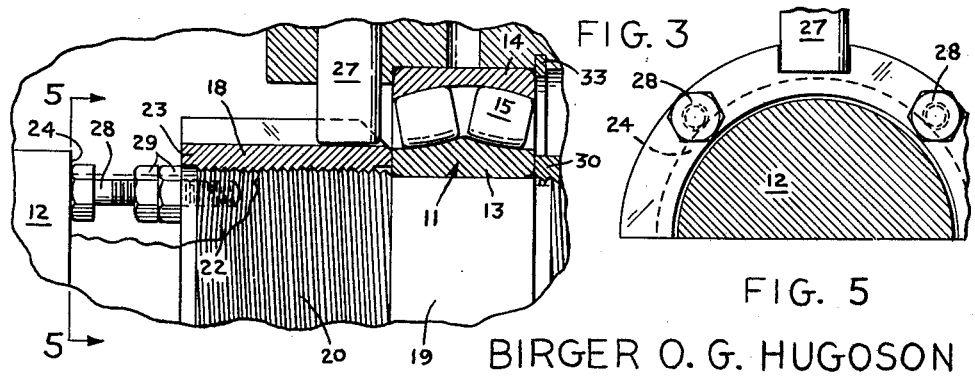
FIG. 4
FIG. 5
BIRGER O. G. HUGOSON
*INVENTOR.*
BY *Daniel B. Bobis*
*Atty*

United States Patent Office 3,124,870
Patented Mar. 17, 1964

3,124,870
MEANS FOR REMOVING BEARINGS FROM A ROTATABLE SHAFT
Birger O. G. Hugoson, Wellsville, N.Y., assignor to Worthington Corporation, Harrison, N.J., a corporation of Delaware
Filed Aug. 11, 1961, Ser. No. 130,995
3 Claims. (Cl. 29—256)

This invention relates generally to means for removing a bearing from a rotatable shaft. More particularly the invention relates to means which exert pressure on the inboard side of the bearing to force the bearing to unseat from the shaft.

It is well known that bearings which are seated on shafts and form a tight fit therewith are difficult to remove. Prior devices used to unseat such bearings by exerting pressure on the inboard side of the bearing have been complicated, unreliable, or their use has caused damage to the bearings being unseated.

The object of the present invention is to produce a novel means for removing bearings from rotatable shafts which will eliminate the above described difficulties while achieving the desired result of unseating the bearing.

In accordance with the present invention a novel device for removing a bearing seated on a shaft is embodied in a housing. A removing member is mounted on the shaft inwardly of the bearing and in abutment thereto. Displacement means are in operative association with the removing member and the shaft. The displacement means move the removing member and the bearing axially to force the bearing to unseat from the shaft.

One of the objects of this invention is to provide a means for removing bearings from rotatable shafts which is reliable, sufficiently simple that a minimum of additional parts are required and danger of damage to the bearing is virtually eliminated.

With this and other objects in view as may appear from the accompanying specification the invention consists of various features of construction and combination of parts which will be first described in connection with the accompanying drawings showing a means for removing a bearing from a rotatable shaft of a preferred form embodying the invention and the features forming the invention will be specifically pointed out in the claims.

In the drawings:
FIGURE 1 is a longitudinal view, partly in section, of a housing showing the improved means for removing the bearing from a rotatable shaft.
FIGURE 2 is a perspective view of the removing member means embodied in the present invention.
FIGURE 3 is a longitudinal sectional view of the housing showing a modified form of the invention.
FIGURE 4 is a longitudinal sectional view of an adjustable removing member means.
FIGURE 5 is a partial sectional view of line 5—5 of FIGURE 4.

Referring to the drawings FIGURE 1 shows a casing or bearing housing 10 having a bearing generally indicated as 11 in which shaft 12 is journaled.

While in the form of the invention illustrated, the bearing 11 is illustrated as being of the roller type which includes an inner race 13, an outer race 14 and rollers 15 therebetween, it will be understood that the bearing 11 could be any bearing applicable to the particular application, without departing from the scope of the invention. Also, the bearing 11 has an inboard end 16 and an outboard end 17.

The shaft 12 is adapted to receive thereon the bearing 11 as hereinafter described and a removing member 18 which serves the dual purpose of positioning the seating of bearing 11 and during unseating of the bearing 11 provides a simple means for exerting a uniform axial force on the inboard end 16 of the bearing 11 to jack bearing 11 off the shaft 12.

Thus as shown in FIGURE 1 the shaft 12 has a bearing receiving section 19 which is of smaller diameter than the diameter of the shaft 12. The bearing receiving section 19 is disposed between an inner threaded section 20 and an outer threaded section 21.

The inner threaded section 20 receives the removing member 18 which is threaded as at 22 on its inner periphery and can be threaded into assembled position until the inboard end 23 of the removing member 18 is brought into abutment with the shoulder 24 of the shaft 12.

The removing member 18, shown in FIGURE 2, is provided with an outer circumference 25 having a lateral groove 26 disposed thereon. The lateral groove 26 of the removing member 18 is adapted to receiving a holding member or pin 27 which during the bearing unseating operation would prevent the removing member 18 from rotating with the shaft 12 for purposes more fully described hereinafter.

While in the preferred form of the invention the removing member 18, illustrated in FIGURE 1, is of fixed length, it is believed clear that the removing member 18 can also be made adjustable. Washers or spacers (not shown) can be put between the removing member 18 and the shoulder 24 of the shaft 12 or between the removing member 18 and the bearing 11.

Adjustable means can be embodied in the removing member 18 as shown in FIGURE 4 by threadedly connecting a plurality of bolts 28 to the inboard end 23 of the removing member 18. The bolts 28 can be adjusted to the desired position and then locked into position by drawing up the two nuts 29 to the inboard end 23 of the removing member 18. The bolts may be conveniently spaced as shown in FIGURE 5 about the inboard end 23 of the removing member 18. The removing member 18 is threadedly connected to the inner threaded section 20 of the shaft 12 and in assembled position the bolts 28 will be in abutment with the shoulder 24 of the shaft 12.

The inner race 13 of the bearing 11 is seated on the bearing receiving section 19 in juxtaposition to the removing member 18.

A locking nut 30 is threadedly received on the outer threaded section 21 and drawn up to lock the bearing 11 at the inner race 13.

The outer race 14 of the bearing 11 is in abutment with the shoulder 31 of the bearing retaining means 32 of the housing 10. By placing a snap ring 33 in the recess 34 of the bearing retaining means 32 the outer race 14 is locked into position. Thus, the bearing 11 is held in assembled position.

When the bearing 11 is to be removed from the shaft 12 the snap ring 33, the locking nut 30, and any sealing means are first taken off. This clears away all the obstacles and leaves nothing that would prevent or hinder the unidirectional axial movement of the bearing 11 during the bearing unseating operation.

Housing 10 has an opening 35 in superposition to the removing member 18 which opening is closed by a removable plug (not shown). During the bearing unseating operation the plug is removed and a pin 27 is passed through the opening 35. The pin 27 extends into the housing 10 until it is in engagement with the lateral groove 26 in the removing member 18 and will have sufficient length so that a portion extends through and outwardly of the opening 35 and this connection will serve to hold the removing member 18 from rotation during the bearing unseating operation as hereinafter described.

Bearing Unseating Operation

In order to unseat the bearing 11 from the shaft 12 the following procedure is prescribed. First, as shown in FIGURE 1, the pin 27 is passed through the opening 35 in the housing 10 until it is in engagement in the lateral groove 26 of the removing member 18. If the pin 27 is not in superposition to the lateral groove 26 of the removing member 18, the shaft 12 is rotated until such alignment is accomplished. The pin 27 will now prevent the removing member 18 from rotating with the shaft 12. On rotation of the shaft 12 the threads of the inner periphery 22 of the removing member 18 and the inner threaded section 20 of the shaft 12 have been so arranged that the removing member 18 will be urged axially away from the shoulder 24 of the shaft 12, when held from rotation, as shown by the arrow in FIGURE 1.

It is also clear that the axial movement of the removing member 18 is not hampered by the pin 27 as the lateral groove 26 provides a means by which the removing member 18 may slide relative the pin 27.

The removing member 18 is in abutment with the bearing 11 and will thus force the bearing 11 to unseat from the shaft 12.

Referring now to FIGURE 3 a shaft 12a having a tapered section 36 is used. It is understood that the shaft 12a is similar to shaft 12 except that the tapered section 36 of the shaft 12a corresponds to the bearing receiving section 19 of the shaft 12 and due to this tapered section 36 the diameter of the outer threaded section 21 has been modified accordingly.

When the shaft 12a is used it may be journaled in two ways. First, a special bearing (not shown) having an inner race adapted to seat on the tapered section 36 of the shaft 12a may be provided, in which case the removal of the special bearing will be the same as that previously described. However, the use of a special bearing is expensive and therefore the second alternative is preferred for many applications.

The second way is to use a conventional bearing, such as the bearing 11, as shown in FIGURE 3, seated on an adapter sleeve 37 which has been previously mounted on the shaft 12a.

Adapter sleeve 37 is provided with a tapered inner diameter 38 of substantially the same taper as that of the tapered section 36 of the shaft 12a. The outer diameter 39 of the sleeve 37 is formed substantially cylindrical corresponding to the inner race 13 of the bearing 11. The adapter sleeve 37 may be of solid construction or of a split type construction.

The method of mounting the adapter sleeve 37 on the shaft 12a, as illustrated in FIGURE 3, will not be described as it is understood by those skilled in the art and also because it does not form a part of the present invention.

After the adapter sleeve 37 is mounted on the tapered section 36 of the shaft 12a, as shown in FIGURE 3, the bearing 11 is assembled into operative position and fixed in place in the same manner as was described hereinbefore with the one exception of the addition of a washer 40 which serves as a locking means for the inner race 13 of the bearing 11.

If the bearing 11 is to be unseated from the adapter sleeve 37 the snap ring 33, locking nut 30, the washer 40 and any sealing means are removed. Thereafter the bearing 11 is unseated in the same manner described under "Bearing Unseating Operation." It is understood that the adapter sleeve 37 has been mounted with sufficient gripping force to remain on the shaft 12a during the bearing unseating operation and also that the outer diameter 39 of the adapter sleeve 37 is sufficiently small to allow the removing member 18 to pass over the adapter sleeve 37 without engagement therewith.

It will be understood that the invention is not limited to the specific construction or arrangement of parts shown but that they may be widely modified within the invention defined by the claims.

What is claimed is:

1. A device for removing a bearing mounted on a rotatable shaft in a housing having a threaded section adjacent the bearing comprising:
   (a) an annular removing member means,
   (b) the removing member means having internal threading adapted to be threadedly connected to the shaft on one side of the bearing and adjacent thereto, and
   (c) pen means to engage the outer perphery of the removing member means to prevent the removing member means from rotating with the shaft and on rotation of the shaft to permit the removing member means to be urged axially in the direction of the bearing to force the bearing to be unseated from the shaft, the pin means adapted to extend into the housing and to be held in operative position by the housing.

2. A device for removing a bearing mounted on a rotatable shaft in a housing having a threaded section adjacent the bearing comprising:
   (a) an annular removing member having a threaded inner periphery and a laterally grooved outer periphery,
   (b) the threaded inner periphery adapted to be threadedly connected to the shaft on one side of the bearing and to remain adjacent thereto during normal rotatable operation of the shaft, and
   (c) pin-like means disposed in the groove of the outer periphery of the removing member to prevent the removing member from rotating with the shaft and on rotation of the shaft to permit the removing member to slide axially in the direction of the bearing to force the bearing to unseat from the shaft and the pin-like means adapted to extend into the housing and to be held in operative position by the housing.

3. A device for removing a bearing mounted on a rotatable shaft journaled in a housing, the shaft having a threaded section adjacent the bearing, the device comprising:
   (a) an annular removing member having a threaded inner periphery and a laterally grooved outer periphery,
   (b) the threaded inner periphery of the removing member adapted to be threadedly connected to the shaft on one side of the bearing and adjacent thereto,
   (c) a pin means adapted to extend into the housing and to be held in operative position by the housing, and
   (d) the pin means to engage the groove of the removing member to prevent the removing member from rotating with the shaft and on rotation of the shaft to permit the removing member to slide axially in the direction of the bearing to urge the bearing to unseat from the shaft.

References Cited in the file of this patent

UNITED STATES PATENTS

| | | |
|---|---|---|
| 1,631,889 | Rappley | June 7, 1927 |
| 1,684,226 | Johnson | Sept. 11, 1928 |
| 1,750,840 | Grover | Mar. 18, 1930 |
| 2,596,549 | Hamilton | May 13, 1952 |
| 2,899,741 | Dunkerley | Aug. 18, 1959 |

FOREIGN PATENTS

| | | |
|---|---|---|
| 683,413 | France | Mar. 3, 1930 |